(12) United States Patent
D'Errico et al.

(10) Patent No.: US 11,249,330 B2
(45) Date of Patent: Feb. 15, 2022

(54) METHODS AND APPARATUS FOR OPTICAL POLARIZATION CONTROL

(71) Applicant: TELEFONAKTIEBOLAGET LM ERICSSON (PUBL), Stockholm (SE)

(72) Inventors: Antonio D'Errico, Pisa (IT); Francesco Giurlanda, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 361 days.

(21) Appl. No.: 16/484,647

(22) PCT Filed: Feb. 9, 2017

(86) PCT No.: PCT/EP2017/052930
§ 371 (c)(1),
(2) Date: Aug. 8, 2019

(87) PCT Pub. No.: WO2018/145753
PCT Pub. Date: Aug. 16, 2018

(65) Prior Publication Data
US 2020/0004056 A1    Jan. 2, 2020

(51) Int. Cl.
*G02F 1/03* (2006.01)
*G02F 1/07* (2006.01)
*G02F 1/01* (2006.01)

(52) U.S. Cl.
CPC .............. *G02F 1/03* (2013.01); *G02F 1/0136* (2013.01)

(58) Field of Classification Search
None
See application file for complete search history.

(56) References Cited

U.S. PATENT DOCUMENTS

| 5,212,743 A | 5/1993 | Heismann |
|---|---|---|
| 2007/0223078 A1 | 9/2007 | Yao et al. |
| 2010/0054737 A1* | 3/2010 | Saperstein ............. H04J 14/06 398/65 |
| 2010/0277798 A1 | 11/2010 | Martelli et al. |

(Continued)

OTHER PUBLICATIONS

International Search Report and the Written Opinion of the International Searching Authority, issued in corresponding International Application No. PCT/EP2017/052930, dated Oct. 13, 2017, 11 pages.

(Continued)

*Primary Examiner* — Darryl J Collins
*Assistant Examiner* — Tamara Y. Washington
(74) *Attorney, Agent, or Firm* — Christopher & Weisberg, P.A.

(57) ABSTRACT

A polarization controller is configured to control polarization of an optical signal. The polarization controller includes a first polarization rotator and a second polarization rotator controllable by control settings. The polarization controller includes a monitor unit configured to generate a monitoring value indicating a performance of the polarization controller. The polarization controller is configured to determine from the monitoring value if the polarization controller is operating in a selected one of a plurality of optimal performance states. If operation is not in an optimal performance state, the polarization controller is further configured to select different control settings to select an alternate one of the plurality of optimal performance states for the polarization controller.

23 Claims, 8 Drawing Sheets

(56) References Cited

U.S. PATENT DOCUMENTS

| 2012/0020659 A1* | 1/2012 | Ibragimov | H04B 10/0775 |
| | | | 398/16 |
| 2015/0131996 A1* | 5/2015 | Izumi | H04J 14/06 |
| | | | 398/65 |

OTHER PUBLICATIONS

D. L. Franzen et al. "Endless Polarisation Control Using Four Fibre Squeezers" Jan. 8, 1987, Electronic Letters, Mar. 12, 1987, vol. 23, No. 6, pp. 290-292.

Fred Heismann, "Analysis of a Reset-Free Polarization Controller for Fast Automatic Polarization Stabilization in Fiber-optic Transmission Systems" Journal of Lightwave Technology, vol. 12, No. 4, Apr. 1994, pp. 690-699.

Haruhito Shimizu et al. "Highly Practical Fiber Squeezer Polarization Controller" Journal of Lightwave Technology, vol. 9. No. 10. Oct. 1991, pp. 1217-1224.

P. Velha et al. "Wide band polarization controller for Si photonic integrated circuits" 2016 Optical Society of America, 4 pages.

Zeqin Lu et al. "Silicon Photonic Polarization Beamsplitter and Rotator for On-chip Polarization Control (Invited Paper)" 2016 IEEE, pp. 70-71.

\* cited by examiner

METHODS AND APPARATUS FOR OPTICAL POLARIZATION CONTROL

CROSS REFERENCE TO RELATED APPLICATION(S)

This application is a 35 U.S.C. § 371 National Phase Entry Application from PCT/EP2017/052930, filed Feb. 9, 2017, designating the United States, the disclosure of which is incorporated herein by reference in its entirety.

TECHNICAL FIELD

The present disclosure relates to methods and apparatus for optical polarization control. The present disclosure also relates to a computer program configured to carry out methods for optical polarization control.

BACKGROUND

Optical signals are used for many purposes, including telecommunication, optical sensing, imaging and security. Some technologies require an optical receiver including a polarization controller. Although sometimes polarization independent devices are pursued, polarization affects the performance of any optical sensors and imaging systems in principle. Polarization control can essentially stabilize and optimize these devices and systems.

In general, polarization controller devices are made of quarter-wave and half-wave plates to enable the transformation from one state of polarization, e.g. as considered on a Poincaré sphere, to another state of polarization. Thus, any possible polarization state may be generated.

Cost-effectiveness, compact package, and flexible design are generally desirable features of polarization controller devices. Also, while adjusting the polarization to any desired state, the change of other optical characteristics such as polarization-dependent loss (PDL), polarization mode dispersion (PMD), and power level should be minimized.

Polarization controllers provide for improved performance and efficiency of optical system, in particular with polarization sensitive devices/systems. A limiting factor may be a low response speed that inhibits the use of a polarization controller in various applications. For instance, the current response speed at millisecond levels is unsuitable for the demanding 40 Gbs PMD compensation applications, due to an inverse square relationship between the response time and line rate.

When it is necessary to track the state of polarization of a travelling electromagnetic wave at the output of a waveguide, an adaptive polarization controller is needed to recover from polarization random fluctuations, and optimize e.g. the matching between the actual wave polarization and an operative receiver sensitivity to a particular incoming state of polarization.

In optical waveguides, for example, optical fibers, e.g. single mode fibers (SMF), the state of polarization of the travelling light fluctuates in time randomly due to temperature and external force-induced birefringence. Any inline device sensitive to a particular state of polarization would need to recover the proper matching between the state of polarization of travelling light and the physical characteristics of the device itself.

In Zeqin Lu, Minglei Ma, Han Yun, Yun Wang, Nicolas A. F. Jaeger, and Lukas Chrostowski "Silicon Photonic Polarization Beam-splitter and Rotator for On-chip Polarization Control", IEEE Group IV Photonics Conference, ThD1, rotational conversions are realized through two phase shifting devices which are so arranged as to be orthogonal alternately to the eigen optical axes, and the phase difference of each device is controlled within the range of variability. Each phase shifter is driven by tuning voltages being capable to apply phase difference in a limited range (i.e. 0, $\pi$), and varying in a limited range of few Volts. If one of these reaches the limit of the range of variability (e.g. reaches the maximum phase difference), that device can no longer move in a direction such as to further increase the phase difference. The polarization controller suffers this limitation as the algorithm and the strategy driving the phase controllers does not evaluate the "unwind" strategy to compensate for the limited range of phase difference and may cause malfunctioning of the entire operative system. Thus, the described polarization controller is not endless, i.e. capable of following the state of polarization of the input light without the need to reset the operative conditions and eventually unwind toward feasible rotational conversions.

Devices based on the use of two phase controller can be driven to be freed from normal control and "unwind" in the direction of the center of the range of variability of phase difference to ensure a sort of endless operation. Without the support of a proper control strategy, the unwinding operation causes the polarization state of the output light to be affected, causing unwanted polarization variation and hence reduction in performance.

An alternative approach to achieving endless like performance may be realized by using more than two phase shifting devices (i.e. to realize rotational conversions), driven with a high precision and accuracy. To enable endless tracking even when a phase shifting device becomes saturated (i.e. not capable to apply the needed rotational conversion), it is necessary that arbitrary conversion is realizable using several stages other than the unwinding stage. In a configuration comprising two phase shifting devices, when one of the phase shifting device saturates, only the remaining phase shifting device can be controlled, and the conditions for endless tracking are not satisfied. Thus to provide the function of endless tracking it is necessary to have at least four phase shifting devices; three for arbitrary conversion and one to compensate for unwanted variations due to the unwinding. With four devices, however, the unwinding operation is complicated, and examples may use five phase shifting devices. However, driving five phase shifting devices with high accuracy may be difficult, and synchronous and complex phase variation matching should be applied as well.

Another possible approach is to limit the number of phase shifting devices but speeding up the "unwind" operation to reduce in time the detrimental effect of the amount of not compensated rotational conversions. If a high speed transmission (10 Gb/s and beyond) is controlled in polarization, the unwind uncompensated effect can be set to occur significantly faster than at least $1/10$ of the period time (e.g. <<10 ps in case of 10 Gb/s) of the transmitted signal to avoid any errored bit in transmission, for instance due to PMD limited optical link or due to a polarization sensitive device used in line or at the receiver side. But the faster is the unwind operation the lower the accuracy in following the state of polarization changes, depending on the amount of steps needed to converge with the control algorithm.

An effective method to compensate for polarization fluctuations is still desirable. For example, in order to find reliable applications in optics or in sensing, imaging and security, a solution which provides speed and reduces complexity of the polarization control, e.g. to achieve the wanted accuracy and ensure the proper system margins, is still required.

SUMMARY

According to a first aspect of the present disclosure, there is provided a polarization controller configured to control polarization of an optical signal. The polarization controller comprises a first polarization rotator and a second polarization rotator controllable by control settings. The polarization controller comprises a monitor unit configured to generate a monitoring value indicating a performance of the polarization controller. The polarization controller is configured to determine from the monitoring value if the polarization controller is operating in a selected one of a plurality of optimal performance states. If operation is not in an optimal performance state, the polarization controller is further configured to select different control settings to select an alternate one of the plurality of optimal performance states for the polarization controller.

Optionally, the polarization controller being further configured to select different control settings to select an alternate one of the plurality of optimal performance states comprises the polarization controller being further configured to select a different control setting for the first polarization rotator and a different control setting for the second polarization rotator.

Optionally, the plurality of optimal performance states are separated by non-optimal performance states for the polarization controller, and/or, control settings in the plurality of optimal performance states are non-contiguous.

Optionally, the different control settings are calculated based on a prediction of control settings to select the alternate one of the plurality of optimal performance states.

Optionally, the polarization controller is configured to determine a plurality of measurements of the monitoring value at a plurality of different control settings, and based on the plurality of measurements of the monitoring value, determine the control settings to select an alternate one of the plurality of optimal performance states for the polarization controller.

Optionally, the polarization controller is configured to determine a plurality of measurements of the monitoring value at a plurality of predetermined different control settings, or, at a plurality of different control settings used whilst operating at or adjacent to one of said plurality of optimal performance states.

Optionally, the polarization controller is configured to vary the control settings at or adjacent the selected one of a plurality of optimal performance states to provide improved performance.

Optionally, the polarization controller is configured to vary the control settings at or adjacent to same optimal performance state to provide improved performance if the monitoring value is between a first and second threshold.

Optionally, the polarization controller is configured to maintain the same control settings on determination from the monitoring value that the polarization controller is operating in a selected one of a plurality of optimal performance states.

Optionally, the first polarization rotator comprises a first phase shifter, and the second polarization rotator comprises a second phase shifter, and optionally, the first and second phase shifters are thermal phase shifters.

Optionally, the polarization controller is a part of a photonic integrated circuit.

According to examples of the present disclosure, a method of polarization control of an optical signal a first polarization rotator and a second polarization rotator controlled by control settings. The method comprises generating a monitoring value indicating a performance of the polarization controller, determining from the monitoring value if the polarization controller is operating in a selected one of a plurality of optimal performance states. If operation is not in an optimal performance state, selecting different control settings to select an alternate one of the plurality of optimal performance states for the polarization controller.

Optionally, selecting different control settings to select an alternate one of the plurality of optimal performance states is by selecting a different control setting for the first polarization rotator and a different control setting for the second polarization rotator.

Optionally, the plurality of optimal performance states are separated by non-optimal performance states for the polarization controller, and/or, control settings in the plurality of optimal performance states are non-contiguous.

Optionally, the method comprises calculating the different control settings based on a prediction of control settings to select the alternate one of the plurality of optimal performance states.

Optionally, the method comprises determining a plurality of measurements of the monitoring value at a plurality of different control settings, and based on the plurality of measurements of the monitoring value, determining the control settings to select an alternate one of the plurality of optimal performance states for the polarization controller.

Optionally, the method comprises determining a plurality of measurements of the monitoring value at a plurality of predetermined different control settings, or, at a plurality of different control settings used whilst operating at or adjacent to one of said plurality of optimal performance states.

Optionally, the method comprises varying the control settings at or adjacent the selected one of a plurality of optimal performance states to provide improved performance.

Optionally, the method comprises varying the control settings at or adjacent to same optimal performance state to provide improved performance if the monitoring value is between a first and second threshold.

Optionally, the method comprises maintaining the same control settings on determination from the monitoring value that the polarization controller is operating in a selected one of a plurality of optimal performance states.

According to examples of the present disclosure, a controller is configured to control a polarization controller having a first polarization rotator and a second polarization rotator controlled by control settings. The controller comprising a processor and a memory, said memory containing instructions executable by said processor whereby said controller is operative to: obtaining a monitoring value indicating a performance of the polarization controller, determining from the monitoring value if the polarization controller is operating in a selected one of a plurality of optimal performance states, and if not, selecting different control settings to select an alternate one of the plurality of optimal performance states for the polarization controller.

According to examples of the present disclosure, a controller is configured to control a polarization controller having a first polarization rotator and a second polarization rotator controlled by control settings. The controller comprising: a monitoring module configured to obtain a monitoring value indicating a performance of the polarization controller, a comparison module configured to determine from the monitoring value if the polarization controller is operating in a selected one of a plurality of optimal performance states, and a processing module configured, if the comparison module indicates operating not in an optimal performance state, selecting different control settings to select an alternate one of the plurality of optimal performance states for the polarization controller.

According to examples of the present disclosure, a computer program product for controlling a polarization controller having a first polarization rotator and a second polarization rotator controlled by control settings, said computer program product comprising a data carrier with instructions according to an example of the disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the disclosure provide a polarization controller able to provide a continual operation, i.e. endless operation, as the polarization of the received optical signal varies over time. The polarization controller is configured to avoid saturation even if using a phase-shifting device with a limited range of phase shifting values. The polarization controller is configured to be set directly, i.e. jump, to an optimal point or range of operation, thus unwinding the polarization rotators with control values which never fall out of the achievable control range and so avoiding the saturation of the operative system. The polarization controller improves the accuracy in finding the best polarization match with optimal working conditions in an optical link, sensor connection or imaging processing or security application.

In some aspects, the polarization controller is configured to reduce an estimation error in setting the wanted output state of polarization by one order of magnitude and reducing the convergence time from tens of seconds to tens milliseconds for the wanted output.

The polarization controller may be part of, or used in association with, a photonic integrated circuit. Such circuits have a low cost, but are polarization sensitive. An example use is for an optical telecommunications circuits. For example, an optical signal may be used to carry radio data in a radio access network, for example, between separated parts of a radio base station. In some examples, the polarization controller is used to receive an optical data signal communicated between a remote radio unit and a baseband unit of a base station, i.e. in a fronthaul optical connection.

Aspects of the disclosure provide for the evaluation of the ellipticity and orientation angle of a polarized light beam. The simplicity and effectiveness of the solution enables cost and power effective implementations suitable for multiple applications, e.g. remote sensing or control in a software driven data communication system.

Figure 1:
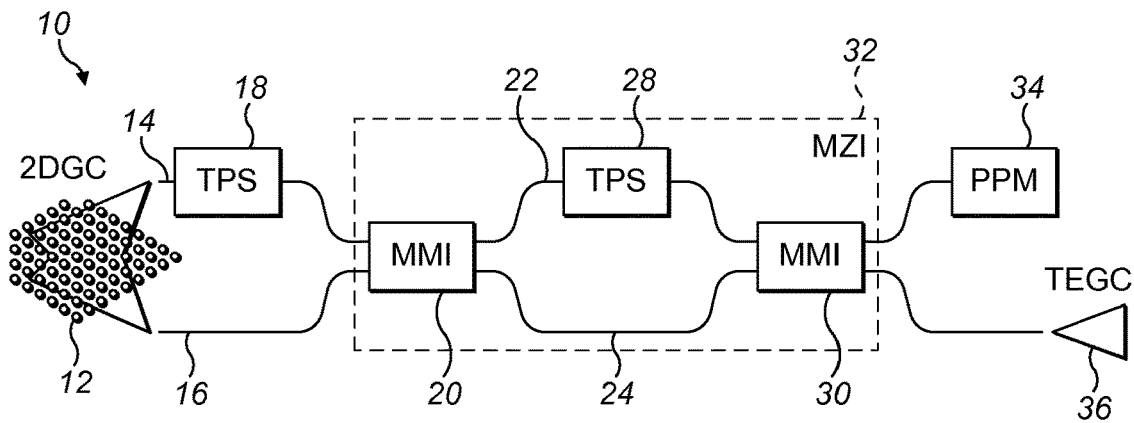
FIG. 1 shows a schematic diagram of an example of polarization controller.

FIG. 1 shows an example implementation of a polarization controller 10. The polarization controller 10 is arranged to receive an optical signal at a two-dimensional grating coupler (2DGC) 12. The optical signal may be an optical signal of any type, for example, carrying a data signal. The optical signal may have any polarization, for example, as introduced during transmission of the optical signal from an optical transmitter. The received optical signal may be considered as two superimposed signals having orthogonal polarizations.

The two-dimensional grating coupler 12 is configured to output two optical signal, onto a first path 14 and a separate second path 16. The optical signal on the first path 14 corresponds to a first polarization of the received optical signal, e.g. along an x-axis. The optical signal on the second path 16 corresponds to a second polarization of the received optical signal, which is orthogonal to the first polarization, e.g. along a y-axis.

The first path 14 comprises a first phase shifter 18. The first phase shifter 18 is configured to apply a first phase shift to the optical signal on the first path 14. The first phase shifter 18 is arranged to only operate on the components along the x-axis. The output of the first phase shifter 18 and the unchanged optical signal on the second path 16 are combined in a first multimode interference coupler (MMI) 20.

The first MMI 20 has two outputs, onto a third path 22 and a fourth path 24. The MMI 20 equally splits the incoming light at the two inputs on the two available outputs, i.e. third path 22 and fourth path 24.

The third path 22 comprises a second phase shifter 28. The second phase shifter 28 is configured to apply a second phase shift to the optical signal on the third path 22; and not to the optical signal fourth path 24. The output of the second phase shifter 28 and the unchanged optical signal on the fourth path 24 are combined in a second MMI 30.

The presence of the phase shifters enables the split tuning function as the result of the beating of the two MMI 20 phase controlled inputs. The light at each MMI 20 input is the sum of the captured light components along the single relevant axis. For example, the path with the first phase shifter 18 is arranged to only operate on the components along the x-axis.

The first and second phase shifters 18,28 may be voltage-driven phase shifters, e.g. the first phase shifter is driven by a voltage $V_1$ and second phase shifter is driven by a voltage $V_2$, which may be considered as control settings. The phase shifters may be considered as cascaded. The first and second phase shifters 18,28 may be thermal phase shifters (TPS), i.e. introducing phase shift by controlling a temperature. The first and second phase shifters may be considered as polarization rotators.

In some aspects, the first polarization rotator comprises a first phase shifter, and the second polarization rotator comprises a second phase shifter, and optionally, the first and second phase shifters are thermal phase shifters.

The first and second MMI 20,30 and second phase shifter 28 may be implemented as a Mach-Zehnder interferometer 32.

The first phase shifter 18 may be considered as tuning the splitting ratio in the two balanced arms of a cascaded Mach-Zehnder interferometer. The second phase shifter 28 may be considered as tuning the phase difference between the two balanced arms of the interferometer 32.

The second MMI 30 has two outputs. One output is to a monitor unit 34, e.g. a photodetector power monitor (PPM). The PPM is a photodetector used as a power monitor configured to generate a photocurrent proportional to the squared intensity of the incident light. As such, output values of the photocurrent of the PPM can may be converted to, or considered as, power values for the incident light.

The other output from MMI 30 is to a grating coupler 36 configured to select only one polarization, e.g. a transverse electric (TE) polarization. In this example, the grating coupler 36 is a Transverse Electric Grating Coupler (TEGC). The Grating Coupler may be implemented as optical discontinuities on the surface of the integrated photonic circuit configured to harvest light incident on a single polarization state, e.g. the TE state. The output from grating coupler 36 may be used as the received optical input signal to another optical component, e.g. on a photonic integrated circuit.

The monitor unit 34 on one Mach-Zehnder Interferometer output arm may be used to determine how much optical energy is coupled on the other output arm, i.e. at the grating coupler 36. The lower the power detected by the monitor unit 34, the higher is the power coupled with the other output arm. The power detected by the monitor unit 34 may be measured as the photodiode current $I_{PD}$, where $I_{PD}=R.E^2$, where $E^2$ is the squared intensity of detected light and R is the responsivity of the photodiode.

The grating coupler 36 is coupled to an output waveguide with a linearly polarized light, e.g. on TE mode. The output of the Mach-Zender Interferometer 32 functions as a polarizer which selects only a single state of polarization. Hence the lower is the power on the monitor unit 34, the greater is the quantity of optical energy transferred by the polarization controller on the linearly polarized output light (TE mode). The MZI 32 is configured to only output TE mode light to the grating coupler 36.

The polarization controller 10 is arranged to use two cascaded polarization rotators, which is sufficient to perform any arbitrary state of polarization conversion, e.g. as illustrated using a Poincaré sphere.

Figure 2:
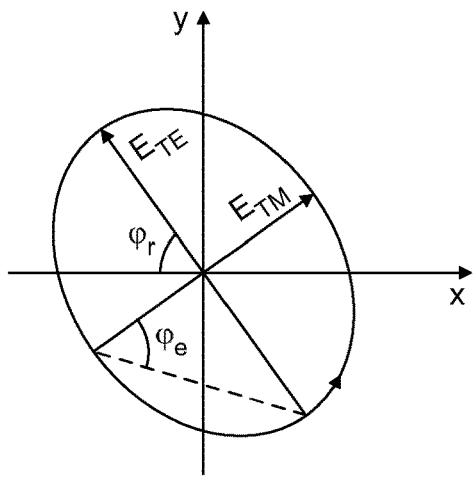
FIG. 2 shows a general illustration of polarization components.

FIG. 2 illustrates a generic elliptical polarization, e.g. as carried by the optical signal received at the polarization controller 10. If the light signal is propagating in a "weakly guiding" waveguide like a single mode optical fiber, then only the transverse electric field components of the optical wave are significant and the eigenmodes of the optical link system are linearly polarized components, TE and Transverse Magnetic (TM), labelled as $E_{TE}$ and $E_{TM}$ respectively. The phase evolution of TE and TM modes at the end of an optical fiber, e.g. of several kilometers, can be described with two stochastic processes:

$\varphi_r$ relevant to the evolution of the orientation angle and $\varphi_e$ relevant with the evolution of the ellipticity angle of the polarization state of the optical beam.

Thus, FIG. 2 shows a polarization state definition in a single mode optical waveguide characterized by the rotational angle against the main axis x and y of the polarization controller, φr, and the ellipticity angle, φe, determined by $E_{TE}$ and $E_{TM}$. $E_{TE}$ and $E_{TM}$ are the magnitudes of the two electric field components of light and are associated to the electric field of TE and TM propagation modes used as the basis vectors to represent any optical state of polarization in a single mode waveguide like a standard optical fiber The ellipticity angle is defined by $E_{TE}$ and $E_{TM}$ as: $\varphi_e$=Arc tang ($E_{TE}/E_{TM}$)

x and y vectors are aligned with the principal state of polarizations of the polarization controller $\varphi_r$, the rotation angle is defined against x and y with respect to the TE mode In an optical waveguide, the eigenmodes of the cross-section along the propagation axis z versus time can be expressed with respect to x and y axis as $$E[t]=E_x[t]x+E_y{}_0[t]y=[E_{TE}(t)\cos(\varphi_r)+E_{TM}(t)\sin(\varphi_r)]x+[E_{TE}(t)\sin(\varphi_r)+E_{TM}(t)\cos(\varphi_r)]y$$

Being $$E_{TM}=E_{TE}(t)\tan g(\varphi_e)\theta^{j\pi/2}$$

$$E_{TE}(t)=E_e{}^{j\omega t}$$

Where E is the electrical field amplitude and ω is the carrier wave in rad/s.

$$E(t)=E_{TE}\{[\cos(\varphi_r)+\tan g(\varphi_e)\sin(\varphi_r)e^{j\pi/2}]x+[\sin(\varphi_r)+\tan g(\varphi_e)\cos(\varphi_r)e^{j\pi/2}]y\}$$

Aspects of the disclosure provide a functional algorithm which can perform the unwind operation in a polarization controller 10, without causing detrimental polarization changes, Aspects provide for evaluating the analytical model best fitting with the real transfer function of the polarization controller.

Figure 3:
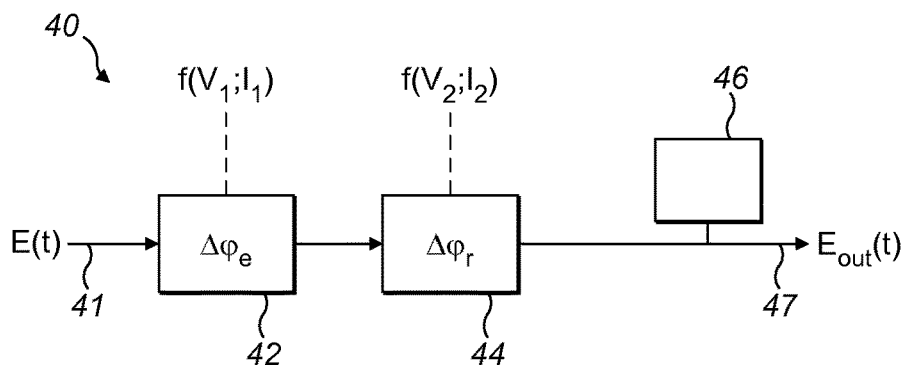
FIG. 3 shows a functional diagram of the example of polarization controller.

FIG. 3 shows a polarization controller 40, illustrating functional units corresponding to the polarization controller 10. The units comprise two cascaded linear polarization rotators modelled as two rotational elements, one rotational element 42 affecting the ellipticity angle, $\Delta\varphi_e$, and the other rotational element 44 tuning the orientation angle, $\Delta\varphi_r$, of an incoming optical beam 41. Each polarization rotation can be driven by a control signal which can be a Voltage or Amperage control $f(V_1, I_1)$ and $f(V_2, I_2)$. The control signals controlling the two rotational elements 42,44 may be considered as based on control settings. As described later, the control settings may be determined by a control element configured as part of, or to control, the polarization controller 10; 40.

A monitor unit 46, corresponding to monitor unit 34, enables a control method operative on $f(V_1, I_1)$ and $f(V_2, I_2)$.

The transfer function of each cascaded rotational element 42,44 (module) are defined as:

$$T_e = \begin{pmatrix} 1 & -je^{-j(\Delta\varphi_e)} \\ -j & -e^{-j(\Delta\varphi_e)} \end{pmatrix} \text{ to change } \Delta\varphi_e$$

$$T_r = \begin{pmatrix} -e^{-j(\Delta\varphi_r)} & -j \\ -je^{-j(\Delta\varphi_r)} & 1 \end{pmatrix} \text{ to change } \Delta\varphi_r$$

The overall transfer function, T, may be written as:

$$T = T_e T_r = \begin{pmatrix} e^{j(\Delta\varphi_r)}(1-e^{-j(\Delta\varphi_e)}) & -j(1+e^{-j(\Delta\varphi_e)}) \\ -je^{j(\Delta\varphi_r)}(1-e^{-j(\Delta\varphi_e)}) & -(1-e^{-j(\Delta\varphi_e)}) \end{pmatrix}$$

Given the transfer function T and the Electrical field associated with TE mode an output 47 of the polarization controller can be defined as follows:

$$E_{out}(t) = TE(t) = Ee^{j\omega t}\begin{pmatrix} e^{j(\Delta\varphi_r)}(1-e^{-j(\Delta\varphi_e)}) & -j(1+e^{-j(\varphi_e)}) \\ -je^{j(\Delta\varphi_r)}(1-e^{-j(\Delta\varphi_e)}) & -(1-e^{-j(\Delta\varphi_e)}) \end{pmatrix}$$

$$\begin{pmatrix} \cos(\varphi_r) + \tan g(\varphi_e)\sin(\varphi_r)e^{j\pi/2} \\ \sin(\varphi_r) + \tan g(\varphi_e)\cos(\varphi_r)e^{j\pi/2} \end{pmatrix}$$

The output 47 may be considered as having an optical energy whose value is a measure of the performance of the polarization controller, as indicated by the monitoring value generated by the monitor unit 46.

Aspects of the disclosure provide a method having an iterative approach that operates with a minimum number of monitors and control parameters. To be iterative, the method uses at least of one monitor unit 34; 46 detecting the working bias of the polarization controller 18,28; 42,44. The monitor unit 34; 46 is sensitive to a particular state of polarization which is in strict relation with the one that should be generated by the polarization controller.

In some examples, the monitor unit 46 in a polarization controller comprises a 1×2 optical splitter with a polarizer on one output arm, selecting only the wanted state of polarization from the input light beam, followed by a photodetector (not shown) in the monitor unit 46 to measure the energy percentage coupled with the selected state of polarization by analyzing the generated photocurrent, $I_{pd}$. Depending on the value of $I_{pd}$ a strategy can be defined to tune the control parameters which can be Voltage or Amperage oriented.

As described above, $I_{pd}$ can be defined as $\alpha R|E\ out(t)|^2$, where R is the responsivity of the photodiode and $\alpha$ is the percentage of light energy resulting by the splitting and polarization selection operation in the monitoring system.

With reference to $E_{out}(t)$ formula, $I_{pd}$ depends on $\varphi_r$, $\varphi_e$, $\Delta\varphi_e$ and $\Delta\varphi_r$. The last parameters can be tuned by driving the polarization controller 10;40 with $f(V_1; I_1)$ and $f(V_2; I_2)$ functions.

The driving operation of the rotational elements 44, 46 can be generally defined using the following relationships:

$$\Delta\varphi_e = f(V_1, I_1)y_1$$

$$\Delta\varphi_r = f(V_2, I_2)y_2$$

where $y_1$ and $y_2$ are the coefficient defining the efficiency of the actuators to obtain a wanted $\Delta\varphi_g$ and $\Delta\varphi_r$, respectively.

The coefficients $y_1$ and $y_2$ depend on the carrier wavelength, the material used to realize the polarization controllers and the working temperature. To have the coefficients $y_1$ and $y_2$ constant, temperature and wavelength stability should be high when operating with the polarization controller.

For simplicity in using symbolism and without loss of generality, the method may be described using voltage control instead of current control (Amperage), considering the relationship between current and voltage. For example, the function defining the rotational elements 42,44 (actuator control), f( ) may be defined by substituting $\Delta\varphi_g$ and $\Delta\varphi_r$ as function of $f(V_1)$ and $f(V_2)$ in the expression for $E_{out}(t)$, given by the defined model. This provides for an expression for Ipd given by:

$$I_{pd} = \alpha R|E|^2\{\cos^2[(f(V_1)y_1 + f(V_2)y_2) + \varphi_r + \varphi_e)] + \cos^2[(f(V_1)y_1 - f(V_2)y_2) + \varphi_r - \varphi_e)]\} + I_0$$

The following three parameters will be used in the method definition: $I_{pd}$, $V_1$, $V_2$. Aspects of the method provide for convergence in successive steps to the optimal values of $V_1$, $V_2$ that minimize or maximize $I_{pd}$, e.g. finds an optimal configuration of the rotational elements 42,44 (e.g. phase controllers 18,28) to maximize the optical output of the polarization controller 10;40.

In the following, the method is explained using a minimization $L_{pd}$. Other configurations may utilize a maximization of the value monitored by the monitor unit (e.g. $I_{pd}$) to obtain an optimal optical output. In this case, references to a minimum value search defined in the following text may be replaced with a maximum value search (e.g. of $I_{pd}$).

The present disclosure utilizes a recognition that there is not a single control setting which provides an optimal monitored output of the polarization controller. Instead, the present disclosure recognizes that at plurality of control settings corresponding to optimal outputs from the polarization controller are possible, using different phase shifts (rotations).

Figure 4A:
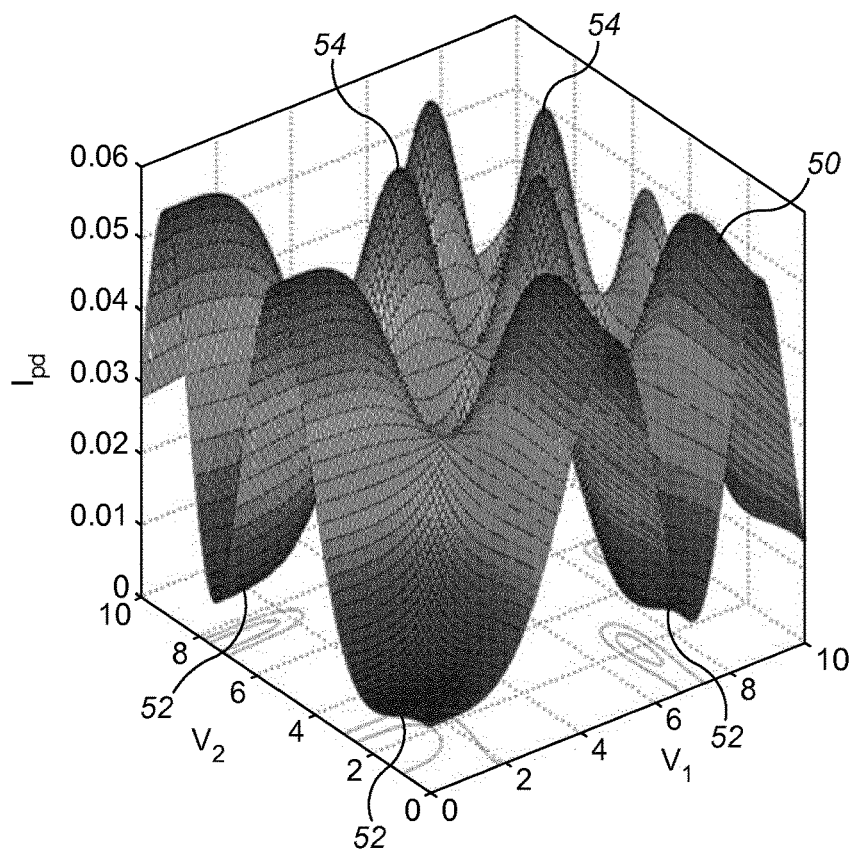
FIGS. 4a and 4b show an example topology of the monitoring value corresponding to control settings of the polarization controller.
Figure 4B:
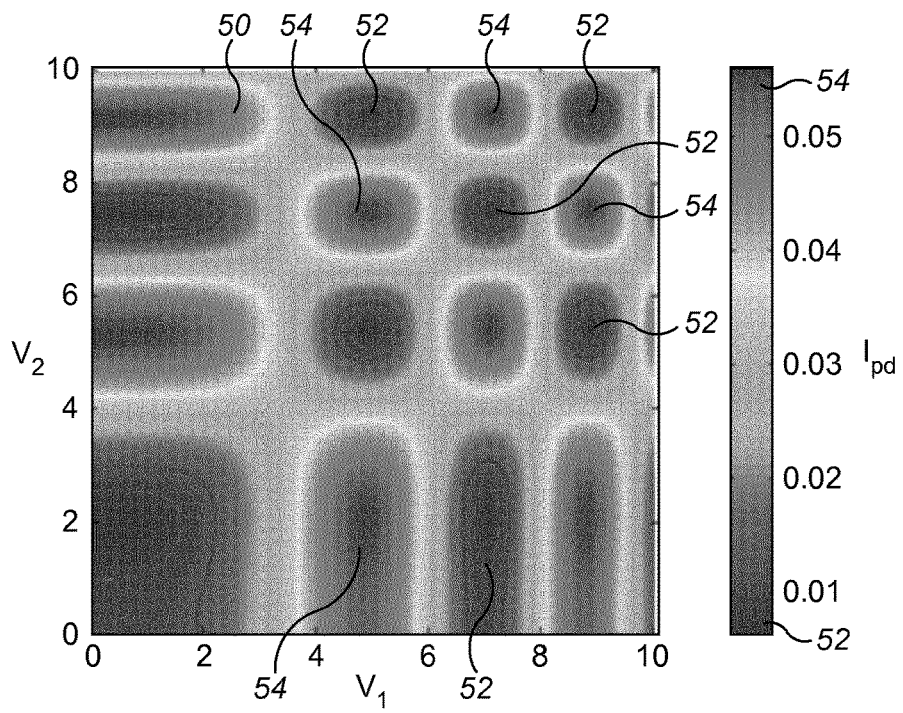

FIGS. 4a and 4b shows values 50 of the monitor unit 34;46 (e.g. PMM 34) according to control settings, e.g. settings controlling the driving voltages, of the first and second rotational elements 42,44 (e.g. first and second phase shifters 18,28). FIG. 4a shows a three dimensional representation, with the monitor output 50 $I_{pd}$ on the vertical (z-axis), and the first and second rotational elements control settings $V_1$,$V_2$ on the horizontal axis (x-axis and y-axis). FIG. 4b shows the same data, in which the first and second rotational elements control settings $V_1$,$V_2$ are shown on the horizontal axis (x-axis) and vertical axis (y-axis) respectively, and the monitor output 50 $I_{pd}$ illustrated using the shading scale shown.

The topology shown is based on $V_1$,$V_2$ and are referred to as the control settings. The phase shifters receive control values f(V1) and f(V2) based on these control settings.

Thus, FIGS. 4a and 4b show that there are a plurality of different settings for the rotational elements (first and second phase shifters) which can provide an optimal state output from the polarization controller. Selecting any one of the plurality of the optimal settings for the rotational elements can provide an optimal output of the polarization controller. The optimal state may refer to the maximum output or performance itself, as well as the adjacent output or performance which is better than a threshold output.

As an example in FIG. 4, the values of $I_{pd}$ 50 in the space of [$V_1$,$V_2$] is reported. In FIG. 4, $f(V_1)$ and $f(V_2)$ are so defined $$f(V_1) = \frac{V_1^2}{R}$$

$$f(V_2) = \frac{V_2^2}{R}$$

The above definition example is given for those actuators 42,44 based on thermal phase shifters 18,28, e.g. characterized by a given resistive impedance, R, and in some examples, having milliseconds of phase tuning time.

In FIGS. 4a and 4b, the minimum areas 52 correspond to the lower or minimal value of $I_{pd}$, corresponding to an optimal or high performance of the polarization controller. The areas 52 may be referred to as optimal performance states 52 of the polarization controller. The maximum areas 54 correspond to the higher or maximal values of $I_{pd}$, corresponding to a non-optimal or poor performance of the polarization controller. The areas 54 may be referred to as non-optimal performance states 54 of the polarization controller. It is seen that on the two-dimensional grid defined by the control settings, the desired minimum areas 52 are separated by maximum areas 54 along the control settings axes. The topology 50,52,54 shifts over time in both the $V_1$ and $V_2$ direction, depending on variations in the polarization of the received optical signal, e.g. as defined by $\varphi_r$ and $\varphi_g$. Thus, variations in the polarization over time causes the example topology shown to shift over time in both the $V_1$, and $V_2$ direction (axes).

Aspects of the disclosure provide a method to tune the phase shifters, e.g. driving values of $V_1$ and $V_2$, to keep the monitored energy (e.g. $I_{pd}$) as low as possible, i.e. minimized.

For example, the method described may track the minimal value of $I_{pd}$ labelled as 52. Thus, as the polarization of the optical signal changes over time, the applied first and second phase shifts are also varied to maintain an optimal energy output from the polarization controller 10;40. An aspect of the disclosure provides for a tracking of an optimal value of the polarization controller output 52 $I_{pd}$, e.g. seen as a topology shifting, caused by the random variation versus time of $\varphi_r$ and $\varphi_e$. Thus, as the polarization changes over time, a corresponding configuration of the phase shifters (control settings) changes over time to track the same optimal output 52. Thus, based on the feedback from the monitoring, the polarization control settings (i.e. phase shifts applied) are continually varied, in fine steps or continuously, in order to maintain the optimal output at an optimal performance area 52. This corresponds to a relatively smooth variation in the polarization controller phase shift settings over time, to track the variations in polarization in the received optical signal.

However, the variations in polarization of the received optical signal may cause the tracked optimal output 52 to go out the range of the rotational elements 42,44. For example, the driving voltages $V_1$ and $V_2$ may be required to go beyond the possible range of the first and second phase shifters in order to maintain the polarization controller providing the optimal output 52. If FIGS. 4a and 4b illustrate the possible useful ranges of the settings of the phase shifters (e.g. $V_1$ and $V_2$), this would correspond to the topology shifting so that the optimal output 52 moving outside of the graphs shown.

In an aspect, a method according to the disclosure determines when the polarization controller will no longer be able to track the polarization variations to maintain the polarization controller at the selected optimal output. Aspects of the disclosure provide for different settings to be selected to jump directly to a different optimal output 58. The different settings are not contiguous with the previous settings. The new optimal output 58 is not contiguous with the previous optimal output 52.

Aspects of the disclosure provide for the polarization controller settings (e.g. controlling phase shifts) to be controlled to not vary to track the selected optimal output. Instead, the polarization controller settings are varied to select a different optimal output configuration, for example different optimal output configuration 59. The different settings are not adjacent or contiguous with the previous settings, and so the settings "jump" directly to the new settings, avoiding the intervening sub-optimal settings.

The present disclosure recognizes that when the polarization variations cause the plurality of optimal and non-optimal performance states to shift with respect to the control settings, the polarization controller has a range of control settings which still includes another, different, optimal performance state 52.

Figure 5:
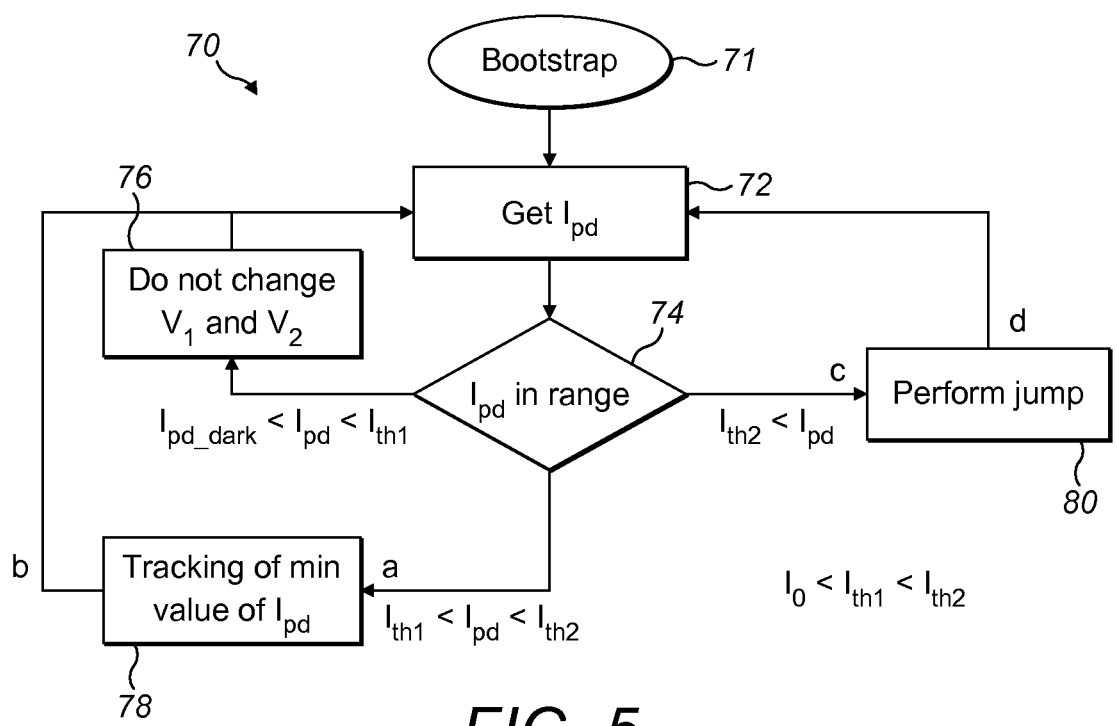
FIG. 5 shows a flowchart of a method of operation of the example of polarization controller.

FIG. 5 shows an example method 70 according to the present disclosure. From a start 71, or bootstrap, the method determines a monitoring value from a monitoring of the polarization controller 10;40, the value providing an indication of the polarization compensation by the polarization controller. In this example, a low or minimum value (e.g. of $I_{pd}$) indicates a good or optimal setting of the rotational control applied by the polarization controller 10;40. The described method can readily be applied to a monitoring providing a high or maximum value indicating a good or optimal setting.

At 72, the monitoring value $I_{pd}$ from the monitor unit 34;46 is determined, for example, by reading of the photodiode that generates $I_{pd}$. Initially, the monitoring value is based on initial settings of the polarization controller, e.g. for the initial values of $V_1$ and $V_2$ driving the phase shifters. In some examples, the initial driving voltage for $V_1$ and $V_2$ is 0 V.

At 74, the monitoring value is $I_{pd}$ is compared to one or more stored threshold. The subsequent operation of the polarization controller depends on the comparison determination, e.g. in which range the monitoring value $I_{pd}$ is identified.

$I_0 \leq I_{pd} < I_{th1}$: the monitoring value $I_{pd}$ is determined to be less than a first threshold. In this case, the monitoring value is relatively close to the minimum, indicating current good performance. The polarization controller may be considered to be in an optimal state or optimal performance if the monitoring value is better than a threshold, e.g. lower than $I_{th1}$. In this case, the method proceeds at 76, and the polarization controller phase shift settings (e.g. $V_1$ and $V_2$) are unchanged. Optionally, the monitoring value is also determined to be higher than a minimum value, e.g. a dark value of the photodiode (labelled as $I_{pd\_dark}$). In some aspects, the method may proceed at 76 if the monitoring value is less than the first threshold, i.e. without a determination that the monitoring value is above the minimum value.

$I_{th1} \leq I_{pd} < I_{th2}$: the monitoring value $I_{pd}$ is determined to be above the first threshold, and below a second threshold. The second threshold is higher (i.e. less desired) than the first threshold. In this case, the method proceeds at 78. The monitoring value indicates the polarization controller is acceptable or good enough, but is not optimal and may be rising. The method at 78 comprises the polarization controller settings varying in order to track the optimal value. For example, the polarization controller starts to move the setting values for the phase shifters, e.g. $V_1$ and $V_2$, around their current values to seek an improved value of $I_{pd}$. This is described in more detail below.

$I_{th2} \leq I_{pd}$: the monitoring value $I_{pd}$ is determined to be above the second threshold. The second threshold indicates a polarization controller which is acceptable, thus, the determination above the second value indicates that the polarization controller is no longer acceptable. In this case, the method proceeds at 80. For example, the value of $I_{pd}$ is getting worse, for example because the phase shifter settings (e.g. $V_1$ and $V_2$) are working at the margin of their working range or the phase is evolving rapidly. In this case, the polarization controller is determined to be required to move directly to another optimal performance area or another optimal settings configuration, e.g. the system must jump to another minimum monitoring value. To carry out the jump directly to a different, non-contiguous, phase shift settings requires a determination of the predicted relationship between the monitoring value and the configuration settings. In some aspects, the jump requires an understanding of the current topology according to the analytical model and the unknown phase value, the use of the topology like a map to find the next optimal (e.g. minimum) monitoring value to select for the phase control settings of the polarization controller. The use of this jump is considered to be different to the tracking of a same optimal performance area in 78.

Following the implementation of 76,78,80, the method returns to 72 and a further determination of the monitoring value, e.g. performing another reading of the photodiode. Thus the method continues over time be a selection, based on the monitoring value, to ether maintain the phase control settings of the polarization controller, vary the phase control settings of the polarization controller to track an optimal range of the polarization controller or jump the phase control settings of the polarization controller to a different optimal range.

Figure 6B:
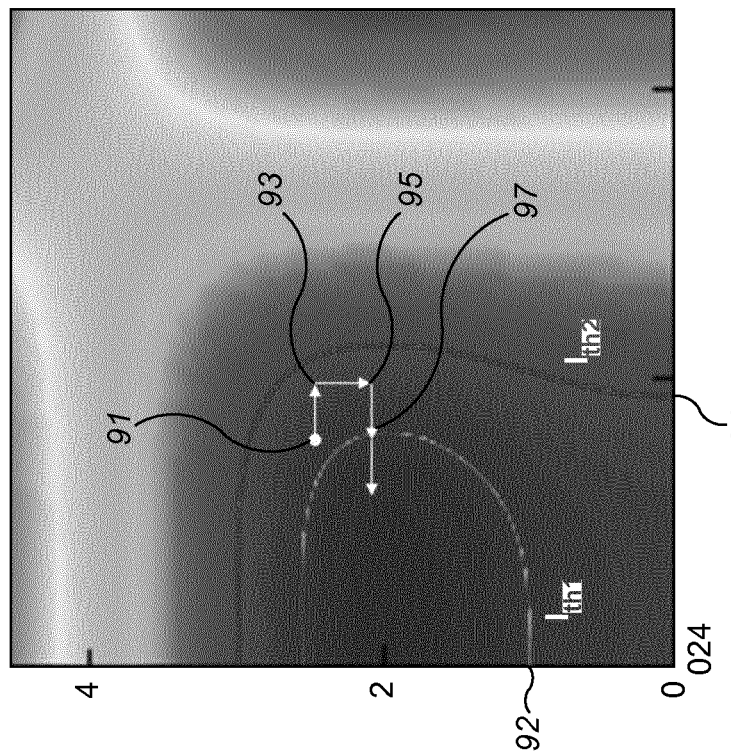
FIGS. 6a and 6b show a flowchart of a part of the method of operation of the polarization controller, and corresponding operation in relation to the topology of the monitoring value, respectively.
Figure 6A:
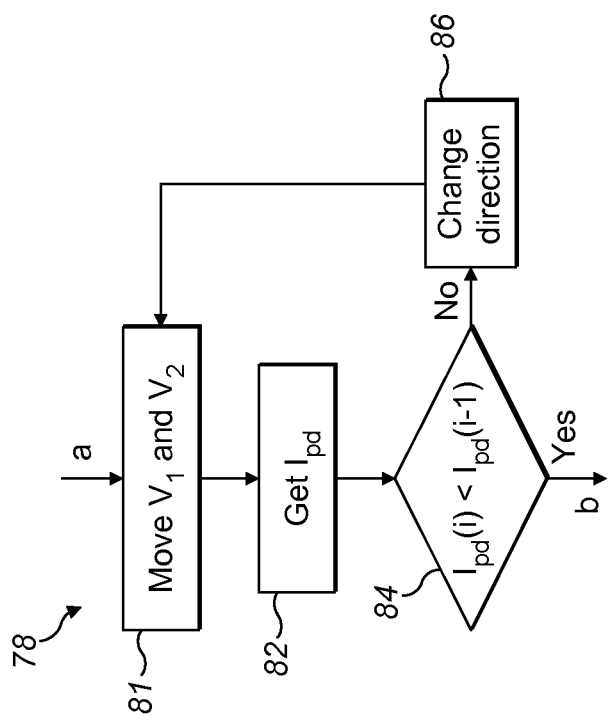

FIGS. 6a and 6b illustrate further details to implement the process described at 78, i.e. when the monitoring value is determined to be between the first threshold and second threshold.

Referring to FIG. 6b, the polarization control settings are initially indicated by a point 91, indicating values of $V_1$ and $V_2$. The point 91 has a monitoring value (indicated by shading) between the first threshold 92 and the second threshold 94.

Referring to FIG. 6a, at 81, the polarization control settings are varied, e.g. $V_1$ and $V_2$ are changed. The change to the polarization control settings is relatively small. The variation to the polarization control settings maintains the polarization control on or adjacent the same optimal range. In particular, the variation to the settings does not change to a different optimal range or performance area.

Referring to FIG. 6b, the polarization control settings are varied from the point 91 to a point 93 in this example.

Referring to FIG. 6a, at 82, a further monitoring value $I_{pd}$ is obtained. At 84, the monitoring value is evaluated, e.g. compared with a previous value of the monitoring value. The comparison may be a direct comparison of the current monitoring value iteration i with the previous iteration i-1, or alternatively, may include an average or offset. In the event that the changed settings represent the polarization controller performance becoming worse, e.g. $I_{pd}(i) > I_{pd}(i-1)$, then the method moves to 86. In the event that the changed settings represent the polarization controller performance becoming better, e.g. Ipd(i)<Ipd(i-1), then the method may continue to track by returning to 81, e.g. for a predetermined number of iterations or until an event is reached. Alternatively, the method may continue by returning to 72 shown in FIG. 5. If returning to 72 in FIG. 5, the polarization controller may continue to track using the process 78 as described in FIG. 6a if the monitoring value is still between the first and second threshold.

At 86, a determination is made to change a direction of variation of the polarization control settings. The direction may be considered as a direction in the two-dimensional space defined by the polarization control setting values, i.e. $V_1$ and $V_2$. The method 78 then continues with changing the polarization control settings at 81 in the changed direction, and the method continues as described.

Referring to FIG. 6b, the point 93 is determined in 84 to provide a worse polarization controller performance than at point 91, e.g. Ipd(i)>Ipd(i-1). Thus, the direction is determined to change in 86. The direction is changed from a direction in which $V_2$ is held constant and $V_1$ is changed (e.g. increased, left-to-right direction as shown), to a direction in which $V_1$ is held constant and $V_2$ is changed (e.g. decreased, top-to-bottom direction as shown). The changed polarization control settings are at point 95. The monitoring value is evaluated at this point in 84, and determined to be worse than the previous iteration of polarization control settings at point 93. Thus, the method is arranged to further change the direction of variation of the polarization control settings in 86. The changed polarization control settings in 81 change the polarization control settings to point 97. Point 97 is evaluated by the determination at 86 to provide improved performance compared to the previous iteration. The direction is therefore not changed, and the method continues either by further moving the polarization control settings in the same direction, i.e. right-to-left as shown, and/or by maintaining the polarization control settings as constant if the monitoring value is determined to be within the first threshold.

In summary, the tracking procedure changes the values of $V_1$ and $V_2$ looking for a lower value of $I_{pd}$, but the system (i.e. polarization controller) reads only a single value of $I_{pd}$ at each cycle, thus the system does not at the initial point know which is the direction to minimize $I_{pd}$. The system starts moving in a random direction and measures the new value of $I_{pd}(i)$. Then, the system compares the value of $I_{pd}(i)$ with the previous value $I_{pd}(i-1)$. If $I_{pd}(i) < I_{pd}(i--1)$ the system continues to move on the current direction, otherwise the system change direction before performing a movement. This tracking is configured to optimize polarization controller performance at or around a single optimal performance area. The optimal performance area is considered to include both the absolute maximum performance, and performance/control settings immediately adjacent, e.g. control settings providing performance above a threshold (e.g. the first threshold).

Figure 7B:
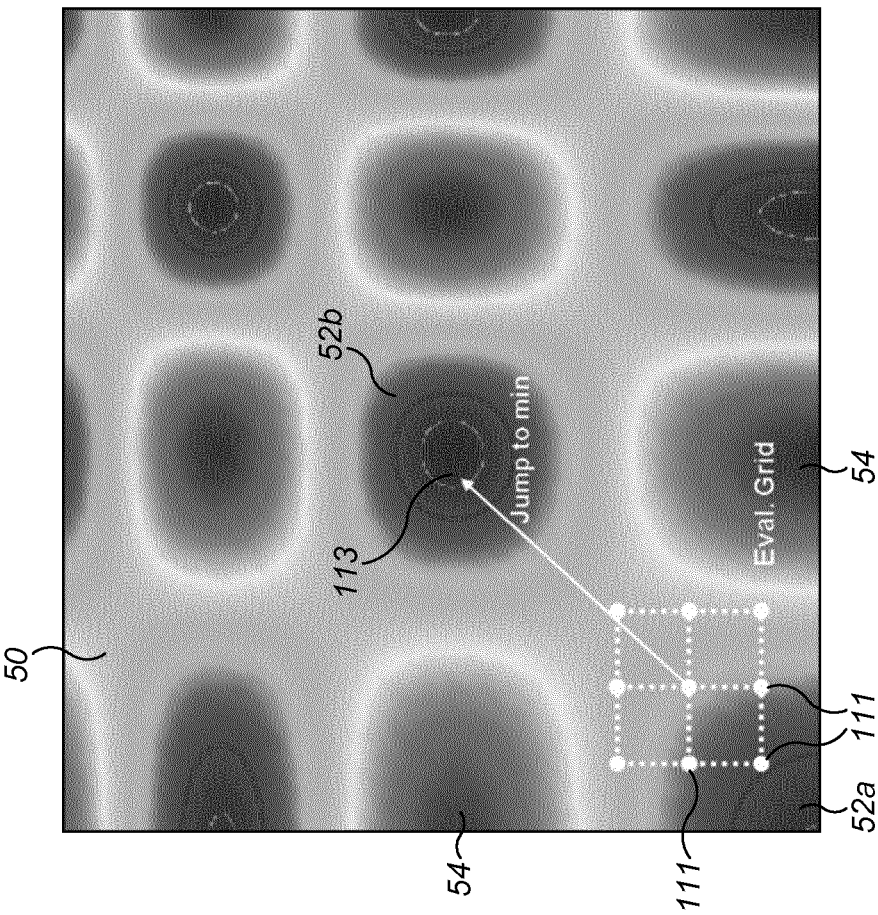
FIGS. 7a and 7b show a further flowchart of a part of the method of operation of the polarization controller, and corresponding operation in relation to the topology of the monitoring value, respectively.
Figure 7A:
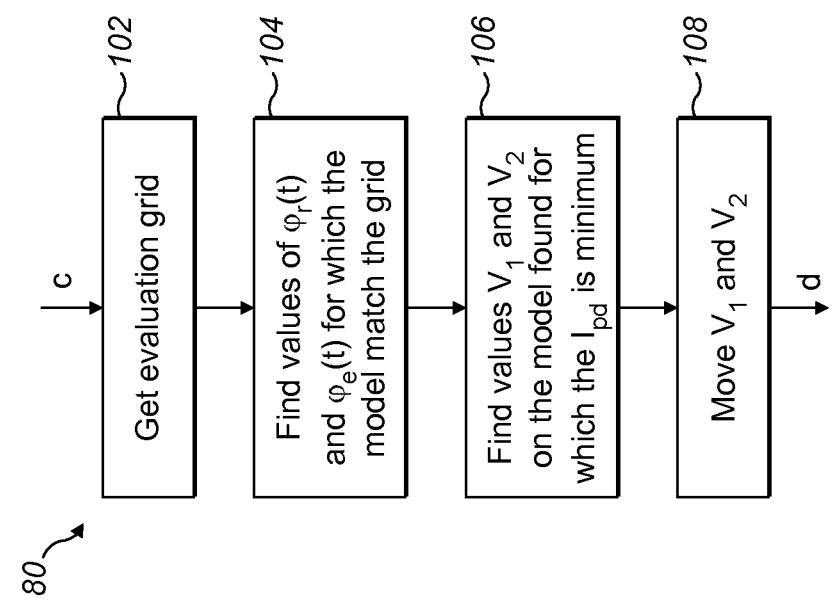

FIGS. 7a and 7b illustrate further details to implement the process described at 80, i.e. when the monitoring value is determined to be beyond the second threshold. The method performs a jump from at or adjacent a first optimal area 52a to another optimal performance area 52b, e.g. having a minimum value of $I_{pd}$. The method 80 is described as performed by the system. The system may be considered as a control entity or controller of the polarization controller, which may be separate or integrated with the polarization controller.

The system computes the current topology 50 of the monitoring value $I_{pd}$. In some aspects, the system is arranged to calculate the closest different optimal performance range of the polarization controller, e.g. minimum of $I_{pd}$.

In 102, the system makes a plurality of measurements of the monitoring value at different polarization control settings 111. For example, the system makes nine measurements 111 of $I_{pd}$ in a squared grid centered on the current polarization control settings having value of $V_1$ and $V_2$. Other numbers or configuration of control settings may be used to determine the performance topology 50.

In 104, the system determines a best match of the monitoring values to a model having varying polarizations, i.e.

different values of $\varphi_r$ and $\varphi_g$. This operation corresponds to measuring the current values of $\varphi_r$ and $\varphi_e$.

The performance topology model 50 is based on $\varphi_r$ and $\varphi_e$, i.e. characterizing the current light state of polarization at the input of the polarizer (see FIG. 2). To each possible couple of values, $\varphi_r$ and $\varphi_g$, is associated a different grid for any value of $V_1$ and $V_2$ in the operative range. To achieve the minimum possible difference between the estimated grid and the real working conditions for any possible $V_1$ and $V_2$, the plurality of measurements (e.g. measurements 111) are carried out from small tracking variations. Once the value for $\varphi_r$ and $\varphi_e$ are estimated with reliable accuracy, values of control settings $V_1$ and $V_2$ can be determined to perform the jump and achieve another minimum of $I_{pd}$ in alternative parts of the current grid. By correlating the monitoring value $I_{pd}$ measurements to a model the actual value of $\varphi_r$ and $\varphi_e$ can be evaluated and the polarization can be tracked with high accuracy by setting the most appropriate value for the control settings $V_1$ and $V_2$.

In 106, with the information about the topology of the monitoring values, and the measured monitoring values and polarization control settings, changed control settings 113 relating to a different optimal range 52b of the polarization controller is identified. In particular, different polarization control settings e.g. $V_1$ and $V_2$, are identified. The different polarization control settings are not based on an iterative measurement and improvement cycle, but instead are based on a predicted range of a different optimal range 113 than the optimal range previously used by the polarization controller. The direct selection of the different optimal range 113 avoids using the polarization controller at non-optimal settings, e.g. indicated by areas 54, and so the polarization controller only operates with a relatively good configuration.

The jump procedure requires that the polarization control of the disclosure computes the current topology of $I_{pd}$ to determine the control settings for a close minimum of $I_{pd}$.

To do this, the polarization control makes a plurality (e.g. nine) measurements of $I_{pd}$, for example, in a square grid centered on the current control settings, e.g. the current value of $V_1$ and $V_2$, then the polarization control determines the best match of the model determining the proper polarization values of $\varphi_r$ and $\varphi_e$.

In 108, the different polarization control settings are selected and used by the polarization controller.

Following the "jump" to different control settings carried out in 108, examples of the method optionally carry out a further optimization of the control settings. The further optimization is optional; the control settings used by 108 may be considered as satisfactory and carrying out no further optimization may increase the speed of response. An example of a further optimization step, if used, is a gradient descent method. In this method, a step wise approach is used in which the control settings (e.g. $V_1$ and $V_2$) are varied whilst the variations in the control settings are detected to improve the performance of the polarization controller. In an example, the performance at each step is used to determine a gradient of the change in performance against a step number. This gradient maintains a predetermined sign (i.e. positive or negative) whilst the performance is improving at each step in the control settings. When the performance at a subsequent step is determined to be decrease, e.g. by a determination that the gradient changes sign, the optimization method stops. In some aspects, the control settings are set to the values measured at the previous step, i.e. the step before the measurement of decreased performance.

The method may further proceed by returning to step 72 in FIG. 5.

In some aspects, the polarization controller 10 is configured to control polarization of an optical signal, the polarization controller comprising a first polarization rotator and a second polarization rotator controllable by control settings. The polarization controller comprises a monitor unit 34 configured to monitor an output of the polarization controller to generate a monitoring value indicating a performance of the polarization controller. The polarization controller is configured to determine from the monitoring value if the polarization controller is operating in a selected one of a plurality of optimal performance states, in 74. If the performance is not, or will not, be optimal, the polarization controller is further configured to select different control settings to select an alternate one of the plurality of optimal performance states 52 for the polarization controller.

Figure 8:
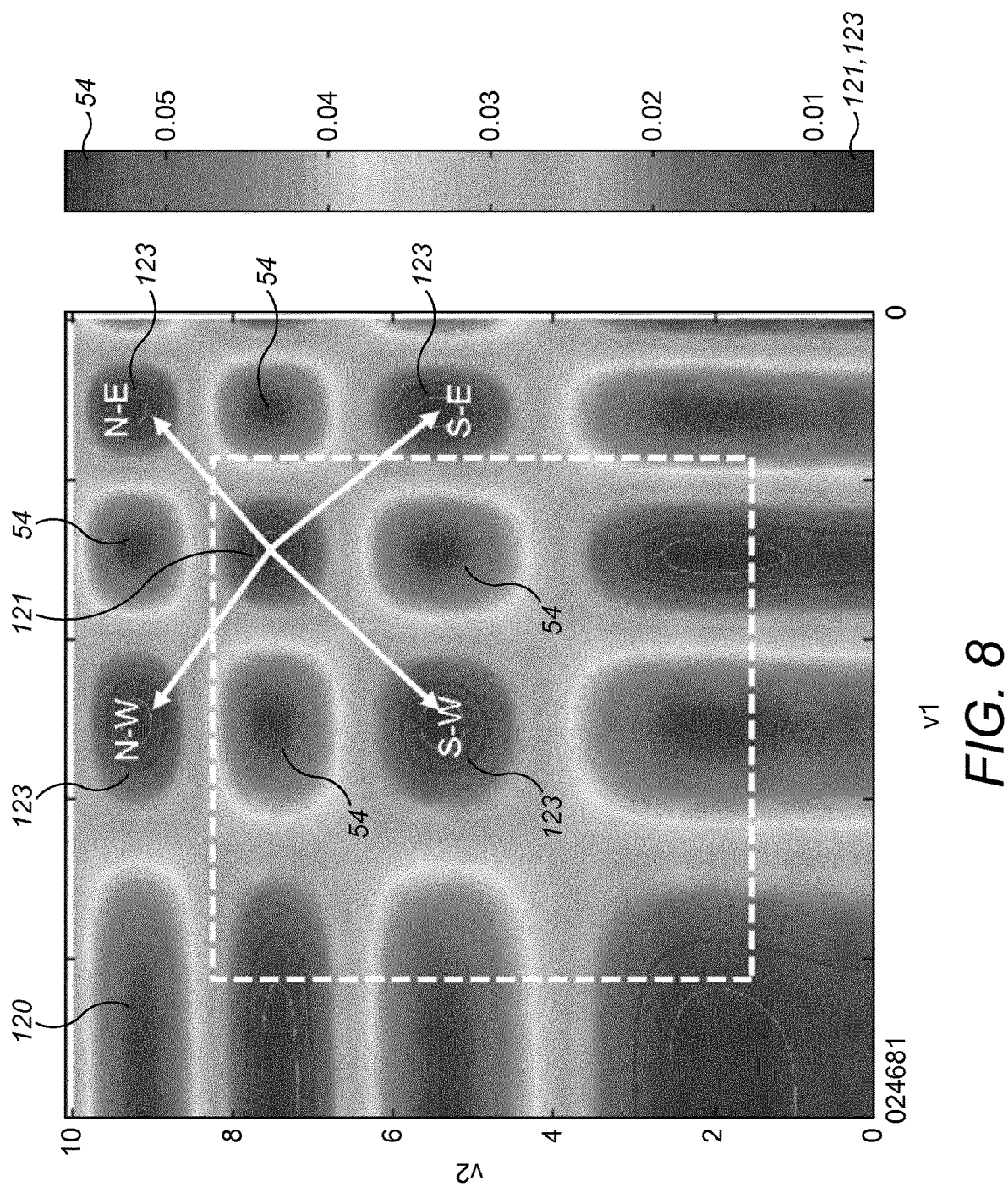
FIG. 8 shows a further operation in relation to the topology of the monitoring value.

FIG. 8 illustrates a further example of the disclosure with a further topology map 120.

The topology map 120 indicates the monitoring value $I_{pd}$ as shading variations for a range of polarization control settings, e.g. $V_1$ and $V_2$. From the optimal performance area 121, e.g. a minimum or lowest area of monitoring value $I_{pd}$, the closest, different, optimal performance areas 123 can be identified. The pattern for the location of the optimal performance areas 123 may be considered as "diagonal" changes in the polarization control setting space, e.g. first and second control settings (e.g. $V_1$ and $V_2$) are both varied, e.g. by the same or substantially the same magnitude, either increasing or decreasing in value.

The present disclosure recognizes that there is a regularity in the pattern described by the analytical model. Taking the orientation of the topology with "North" upwards, it is possible to identify the closest minimums moving in the direction North-East, North-West, South-East and South-West from the current minimum. Aspects of the disclosure determines a relationship between a generic minimum in the plane $[V_1, V_2]$ and its closest minimum area 123. This information is used to determine the position of the current minimum and returns four positions of the four surrounding minimums. This operation has a very low computation cost respect to the "jump" operation described above that uses the gradient descent technique. In particular, this example avoids taking measurements on the nine points shown in FIG. 7b, in order to reduce computational cost and enhance system execution.

Aspects of the method performs the "jump" when the current optimal performance area 121 (minimum) comes close to the limits of the operative range of the phase shifters. In the model as defined in FIGS. 4a and 4, a fixed relationship of mutual distance and relative positions among adjacent optimal performance area 121 (minima) in the grid topology can be "learned" step by step when the normal tracking operation is running. Bases on these measurements, the adjacent different optimal performance areas (minima) can be effectively tracked by the polarization controller after a number of performance measurements, e.g. $I_{PD}$ topology updates. Thus, after a learning period, the polarization controller stores information to allow performing a jump directly to another optimal performance area (minimum) adjacent to the current optimal performance area without separately measuring preliminary nine working points as described above. Operating in this fashion, the jump can be performed in a single shot when necessary, thus limiting the number of calculations and/or measurements needed to converge toward a reliable solution of control settings.

In some aspects, the method determines relevant adjacent optimal performance areas in four different orthogonal directions on the grid: North-East, Nord-West, South-East and South-West from the current optimal performance area. The selected optimal performance area must, even as an adjacent optimal performance area 123, remain in the operative range of the polarization controller.

Aspects of the method comprise identifying a plurality of different optimal performance areas. In order to select one of the plurality of different optimal performance areas 123, the control settings of the plurality of different optimal performance areas are compared with threshold values Vmin and Vmax for each control setting. The threshold values Vmin and Vmax for each control setting may be considered as defining a box (dashed lines) for acceptable control setting values, i.e. between Vmin and Vmax for all control settings. The Vmin and Vmax may be the same or independently set for each control setting. Vmin and Vmax may be considered as the minimum and maximum control settings which are possible, i.e. defining the working range of the phase shifters. In order to continue future operation at the selected different optimal performance area, the selected different optimal performance area is within the minimum and maximum control settings, i.e. within the box shown. In some examples, if more than one different optimal performance is within the minimum and maximum control settings, the method may select the different optimal performance area which provides for the longest time being selected, e.g. furthest from the minimum and maximum control settings. In this example, the S-W different optimal performance area would be selected. Thus, the adjacent different optimal performance area (minima) selected remains in the operative range. Hence, Vmin and Vmax in FIG. 8 define safe boundaries that also adjacent minima remain sufficiently far from the operative range limits. The box shown effectively becomes the new operative range limits.

Figure 9:
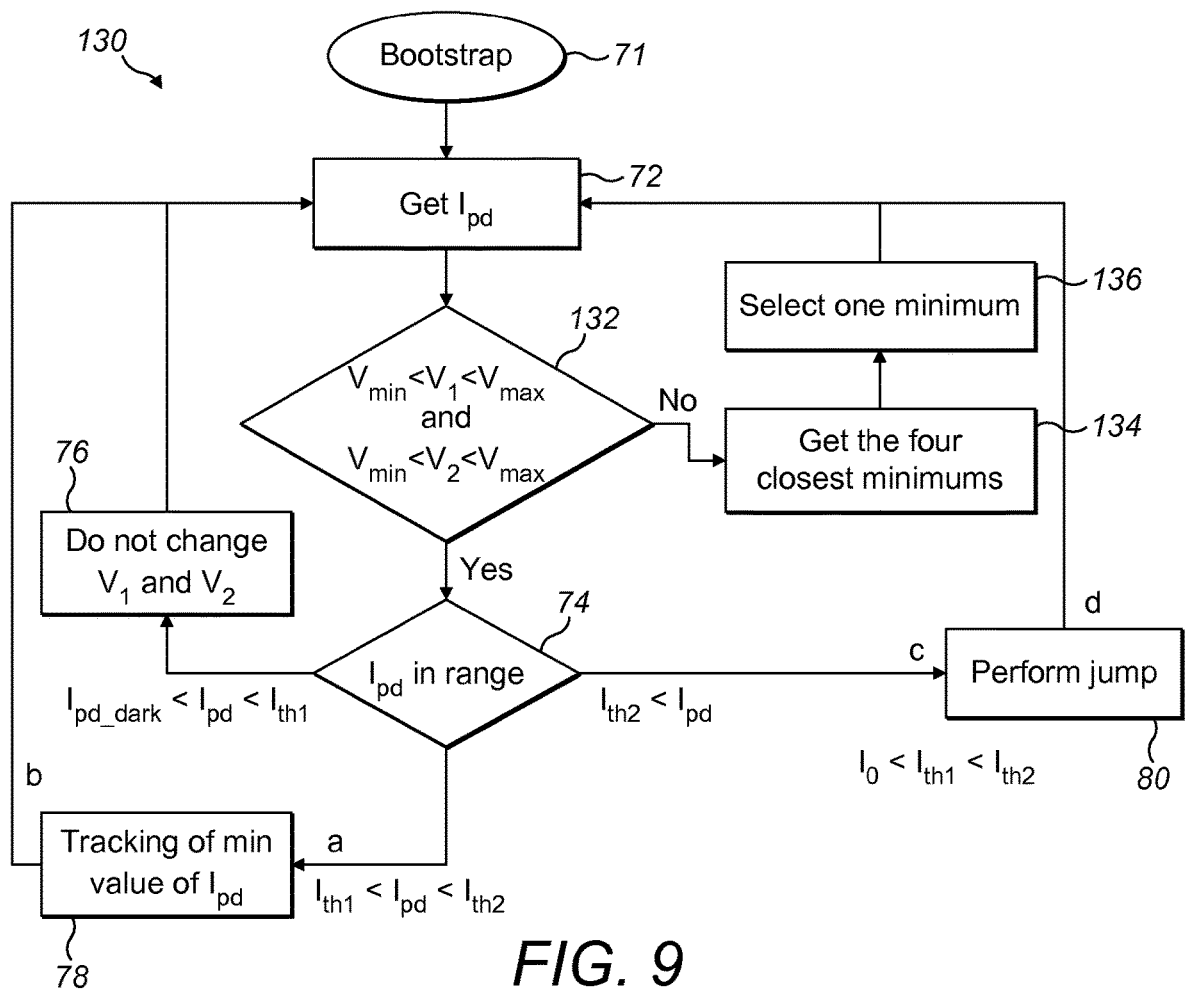
FIG. 9 shows a further flowchart of a method of operation of the example of polarization controller.

FIG. 9 shows a further example of the phase control method 130. The method 130 is based on the method 70 of FIG. 5, with additional elements. The method 130 comprises elements 71,72,74,76,78 and 80 substantially as described in method 70, and so the same reference numerals are used.

In addition, method 130 comprises a step 132 carried out between the step 72 and 74. In 132, a determination is made on whether the polarization control settings (e.g. $V_1$ and $V_2$) are within predefined values, e.g. thresholds $V_{min}$ and $V_{max}$. If the polarization control settings are each within the thresholds $V_{min}$ and $V_{max}$, the method 130 proceeds with 74 as described with respect to FIG. 5.

If any of the polarization control settings are outside the thresholds $V_{min}$ and $V_{max}$, or a predefined amount from the thresholds, the method continues at 134. In 134, the four closest optimal performance areas 123 (e.g. areas of minimum monitoring value) are determined.

In 136, one of the four closest optimal performance areas 123 is selected, e.g. the optimal performance area 123 furthest from the control setting limits, and the polarization control settings are changed to be set directly (i.e. jump) to the values for the selected performance area 123.

In some aspects, the polarization controller is configured to select a different control setting for the first polarization rotator and a different control setting for the second polarization rotator. The plurality of optimal performance states 52, 113, 123 are separated by non-optimal performance states for the polarization controller, and/or, control settings in the plurality of optimal performance states are non-contiguous.

In some aspects, the different control settings are calculated based on a prediction of control settings to select the alternate one of the plurality of optimal performance states 52,113,123.

In some aspects, the polarization controller is configured to determine a plurality of measurements of the monitoring value at a plurality of different control settings, and based on the plurality of measurements of the monitoring value, determine the control settings to select an alternate one of the plurality of optimal performance states for the polarization controller. For example, the polarization controller is configured to determine a plurality of measurements of the monitoring value at a plurality of predetermined different control settings 111, or, at a plurality of different control settings 91,93,95,97 used whilst operating at or adjacent to one of said plurality of optimal performance states.

Figure 10:
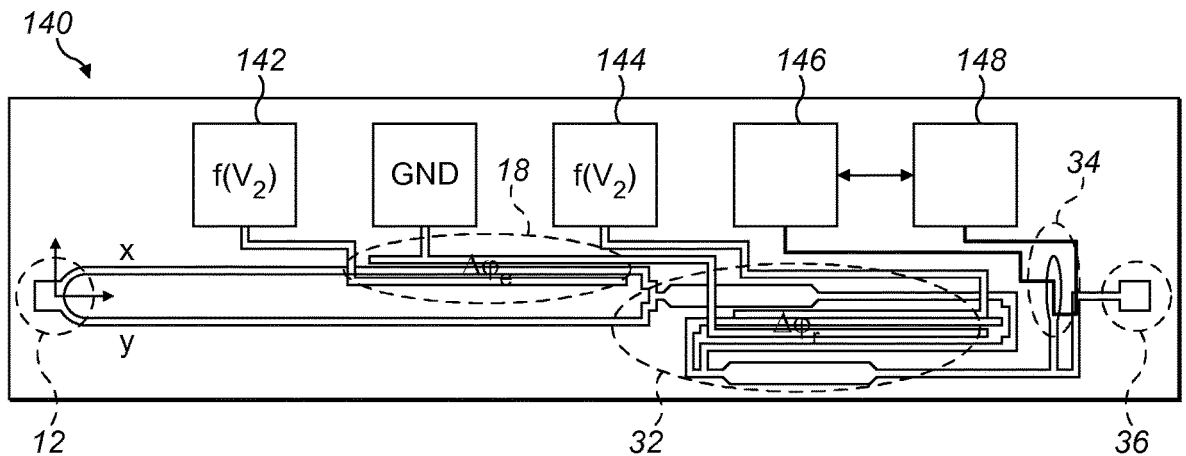
FIG. 10 shows an example of the polarization controller implemented in a photonic integrated circuit.

FIG. 10 shows an example of a polarization controller 140 according to the disclosure implemented on a photonic integrated circuit, corresponding to the polarization controller 10. Corresponding components are labelled with the same reference numerals. The polarization controller 140 comprises two cascaded polarization rotators realized with phase shifters 18,28. One phase shifter 18 acts on the components on an x-axis selected through the grating coupler 12. A further phase shifter 28 is positioned on a single arm of the Mach-Zehnder interferometer 32 to properly tune the phase difference between the two balanced arms of the interferometer. Functions based on the polarization control settings may be applied on 142,144, and the monitoring value is obtained from monitoring current between areas 146, 148.

Figure 11:
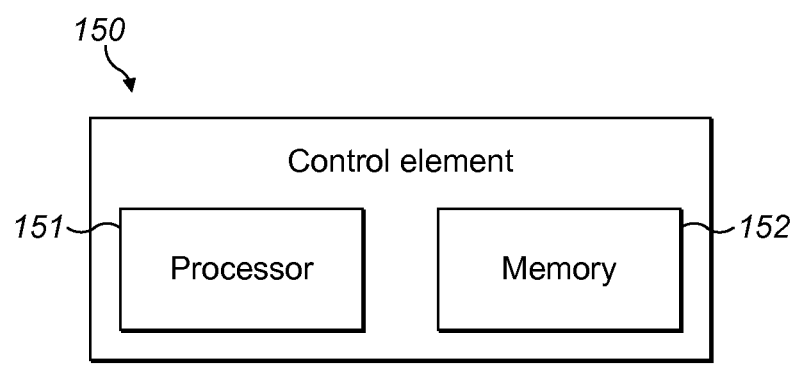
FIG. 11 shows an example of a control element of the polarization controller.

FIG. 11 illustrates a first example of a control element 150, also referred to as a controller, for the polarization controller of any example, for example which may implement the method 70 or the method 130 or any aspect described. In some aspects, the control element implements a described method on receipt of suitable instructions from a computer program. The controller may be considered as obtaining the monitoring value from the monitor unit, either because the monitor unit is integral or connected to the controller.

The control element 150 comprises a processor 151 and a memory 152. The memory 152 contains instructions executable by the processor 151 such that the control element 150 is operative to conduct some or all of the steps of any described method.

The processor 151 may be considered as processing circuitry, for example, provided using any combination of one or more of a suitable central processing unit (CPU), multiprocessor, microcontroller, digital signal processor (DSP), etc., capable of executing software instructions stored in a computer program product e.g. in the form of a memory, also termed a storage medium. The processing circuitry may further be provided as at least one application specific integrated circuit (ASIC), or field programmable gate array (FPGA). The processor 151 or processing circuitry is configured to cause the polarization controller to perform a set of operations, or steps, as disclosed above. For example, the memory may store the set of operations, and the processor 151 may be configured to retrieve the set of operations from the memory 152 to cause the polarization controller 10,40,140 to perform the set of operations. The set of operations may be provided as a set of executable instructions. Thus the processor is thereby arranged to execute methods as herein disclosed.

The memory may also comprise persistent storage, which, for example, can be any single one or combination of magnetic memory, optical memory, solid state memory or even remotely mounted memory. The control element 150 may be integrated with the polarization controller, or may be separate.

Aspects of the disclosure provide a computer program product for controlling a polarization controller having a first polarization rotator and a second polarization rotator controlled by control settings, said computer program product comprising a data carrier with instructions according to any example.

Figure 12:
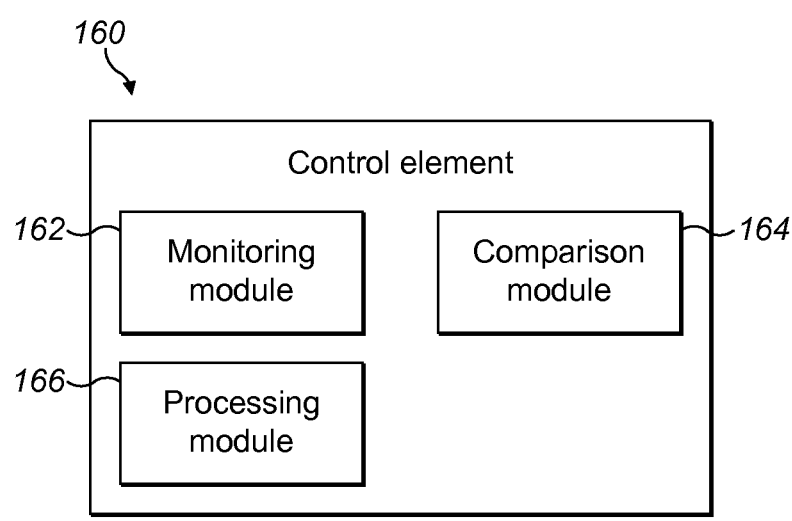
FIG. 12 shows a further example of a control element of the polarization controller.

FIG. 12 illustrates another example of control element 160, also referred to as a controller, which may perform the method or any aspect as discussed above in any example. The elements illustrated in FIG. 12 may be logical elements or may be dedicated physical elements and may include one or more processors. The elements may be implemented in hardware and/or software and may be integrated to any degree.

Referring to FIG. 12, the control element 160 comprises a monitoring module 162 for measuring a performance indicator of the polarization controller according to the current control settings, e.g. $I_{pd}$, as described above. The controller may be considered as obtaining the monitoring value from the monitor unit, either because the monitor unit is integral or connected to the controller. The control element 160 also comprises a comparison module 164 for comparing the monitoring value with one or more thresholds. In some examples, the comparison module 164 is configured to compare the current polarization control settings with one or more thresholds and/or the monitoring value with one or more performance thresholds. The control element 160 further comprises a processing module 166 configured to calculate future changed or constant values of the polarization control settings according to the method described. For example, the processing module 166 is configured, if the comparison module indicates operating not in an optimal performance state, selecting different control settings to select an alternate one of the plurality of optimal performance states for the polarization controller.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form. A single processor or other unit may fulfil the functions of several units recited in the claims.

The polarization controller may refer to the optical device carrying out the polarization including the control element. As such, the polarization controller may be considered as having the functionality as shown by the methods described above.

The present disclosure is in contrast to a strategy which only converges toward a stable output state of polarization using only smooth and small variations. Instead, aspects of the present disclosure utilize a model, providing for a prediction of alternative operative conditions of the polarization controller. This allows for unwinding operations without affecting the polarization state of the output light can be affected, and providing for of fast polarization fluctuations (e.g. milliseconds and less) in real system operative conditions.

Aspects of the disclosure use a definition of the most suitable analytical model characterizing the operation of a polarization controller realized by cascading optical polarization rotators. The polarization control strategy avoids saturation even if using a polarization controller, e.g. a polarization rotation device, with control signals variable over a limited range.

The invention claimed is:

1. A polarization controller configured to control polarization of an optical signal, the polarization controller comprising a first polarization rotator and a second polarization rotator controllable by control settings, wherein the polarization controller comprises:
a monitor unit configured to generate a monitoring value indicating a performance of the polarization controller, wherein the polarization controller is configured to determine from the monitoring value if the polarization controller is operating in a selected one of a plurality of optimal performance states, and if not, the polarization controller is further configured to select different control settings to select an alternate one of the plurality of optimal performance states for the polarization controller.

2. The polarization controller as claimed in claim 1, wherein the polarization controller being further configured to select different control settings to select an alternate one of the plurality of optimal performance states comprises the polarization controller being further configured to select a different control setting for the first polarization rotator and a different control setting for the second polarization rotator.

3. The polarization controller as claimed in claim 1, wherein the plurality of optimal performance states are separated by non-optimal performance states for the polarization controller, and/or, control settings in the plurality of optimal performance states are non-contiguous.

4. The polarization controller as claimed in claim 1, wherein the different control settings are calculated based on a prediction of control settings to select the alternate one of the plurality of optimal performance states.

5. The polarization controller as claimed in claim 1, wherein the polarization controller is configured to determine a plurality of measurements of the monitoring value at a plurality of different control settings, and based on the plurality of measurements of the monitoring value, determine the control settings to select an alternate one of the plurality of optimal performance states for the polarization controller.

6. The polarization controller as claimed in claim 5, wherein the polarization controller is configured to determine a plurality of measurements of the monitoring value at a plurality of predetermined different control settings, or, at a plurality of different control settings used while operating at or adjacent to one of said plurality of optimal performance states.

7. The polarization controller as claimed in claim 1, wherein the polarization controller is further configured to vary the control settings at or adjacent to the selected one of a plurality of optimal performance states to provide improved performance.

8. The polarization controller as claimed in claim 1, wherein the polarization controller is further configured to vary the control settings at or adjacent to a same optimal performance state to provide improved performance if the monitoring value is between a first and second threshold.

9. The polarization controller as claimed in claim 1, wherein the polarization controller is further configured to maintain the same control settings on determination from the monitoring value that the polarization controller is operating in a selected one of a plurality of optimal performance states.

10. The polarization controller as claimed in claim 1, wherein the first polarization rotator comprises a first phase shifter, and the second polarization rotator comprises a second phase shifter.

11. The polarization controller as claimed in claim 1, wherein the polarization controller is a part of a photonic integrated circuit.

12. A method of polarization control of an optical signal by a polarization controller, the polarization controller comprising a first polarization rotator and a second polarization rotator controlled by control settings, comprising:
   generating a monitoring value indicating a performance of the polarization controller;
   determining from the monitoring value if the polarization controller is operating in a selected one of a plurality of optimal performance states; and if not,
   selecting different control settings to select an alternate one of the plurality of optimal performance states for the polarization controller.

13. The method as claimed in claim 12, comprising selecting different control settings to select an alternate one of the plurality of optimal performance states by selecting a different control setting for the first polarization rotator and a different control setting for the second polarization rotator.

14. The method as claimed in claim 12, wherein the plurality of optimal performance states are separated by non-optimal performance states for the polarization controller, and/or, control settings in the plurality of optimal performance states are non-contiguous.

15. The method as claimed in claim 12, further comprising calculating the different control settings based on a prediction of control settings to select the alternate one of the plurality of optimal performance states.

16. The method as claimed in claim 12, further comprising determining a plurality of measurements of the monitoring value at a plurality of different control settings, and based on the plurality of measurements of the monitoring value, determining the control settings to select an alternate one of the plurality of optimal performance states for the polarization controller.

17. The method as claimed in claim 16, further comprising determining a plurality of measurements of the monitoring value at a plurality of predetermined different control settings, or, at a plurality of different control settings used while operating at or adjacent to one of said plurality of optimal performance states.

18. The method as claimed in claim 12, further comprising varying the control settings at or adjacent to the selected one of a plurality of optimal performance states to provide improved performance.

19. The method as claimed in claim 12, further comprising varying the control settings at or adjacent to a same optimal performance state to provide improved performance if the monitoring value is between a first and second threshold.

20. The method as claimed in claim 12, further comprising maintaining the same control settings on determination from the monitoring value that the polarization controller is operating in a selected one of a plurality of optimal performance states.

21. A controller configured to control a polarization controller having a first polarization rotator and a second polarization rotator controlled by control settings, the controller comprising a processor and a memory, said memory containing instructions executable by said processor whereby said controller is operative to:
   obtain a monitoring value indicating a performance of the polarization controller;
   determine from the monitoring value if the polarization controller is operating in a selected one of a plurality of optimal performance states; and if not,
   select different control settings to select an alternate one of the plurality of optimal performance states for the polarization controller.

22. A controller configured to control a polarization controller having a first polarization rotator and a second polarization rotator controlled by control settings, the controller comprising:
   a monitoring module configured to obtain a monitoring value indicating a performance of the polarization controller;
   a comparison module configured to determine from the monitoring value if the polarization controller is operating in a selected one of a plurality of optimal performance states; and
   a processing module configured, if the comparison module indicates operating not in an optimal performance state, for selecting different control settings to select an alternate one of the plurality of optimal performance states for the polarization controller.

23. A computer program product for controlling a polarization controller having a first polarization rotator and a second polarization rotator controlled by control settings, said computer program product comprising a non-transitory computer readable medium storing a computer program comprising instructions which, when executed on at least one processor, cause the at least one processor to:
   obtain a monitoring value indicating a performance of the polarization controller;
   determine from the monitoring value if the polarization controller is operating in a selected one of a plurality of optimal performance states; and if not,
   select different control settings to select an alternate one of the plurality of optimal performance states for the polarization controller.

* * * * *